(12) United States Patent
Kumon

(10) Patent No.: US 9,723,275 B2
(45) Date of Patent: Aug. 1, 2017

(54) VEHICLE SURROUNDINGS MONITORING APPARATUS AND VEHICLE SURROUNDINGS MONITORING METHOD

(71) Applicant: Hitoshi Kumon, Aichi-ken (JP)

(72) Inventor: Hitoshi Kumon, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 327 days.

(21) Appl. No.: 14/359,739

(22) PCT Filed: Nov. 16, 2012

(86) PCT No.: PCT/IB2012/002371
§ 371 (c)(1),
(2) Date: May 21, 2014

(87) PCT Pub. No.: WO2013/076544
PCT Pub. Date: May 30, 2013

(65) Prior Publication Data
US 2014/0300743 A1  Oct. 9, 2014

(30) Foreign Application Priority Data

Nov. 24, 2011  (JP) .................. 2011-256110

(51) Int. Cl.
*H04N 9/47* (2006.01)
*H04N 7/18* (2006.01)
*B60R 1/00* (2006.01)
*G08G 1/16* (2006.01)
*G06T 11/00* (2006.01)

(52) U.S. Cl.
CPC ............... *H04N 7/183* (2013.01); *B60R 1/00* (2013.01); *G06T 11/00* (2013.01); *G08G 1/166* (2013.01); *B60R 2300/303* (2013.01)

(58) Field of Classification Search
CPC ........ H04N 7/183; G06T 11/00; G08G 1/166; B60R 1/00; B60R 2300/303
USPC .......................................... 348/148
See application file for complete search history.

(56) References Cited

U.S. PATENT DOCUMENTS

| 6,515,597 | B1 | 2/2003 | Wada et al. | |
| 2007/0009137 | A1* | 1/2007 | Miyoshi | B60R 1/00 382/104 |
| 2007/0210937 | A1* | 9/2007 | Smith | G08G 1/0962 340/995.1 |
| 2010/0121576 | A1* | 5/2010 | Aso | G01S 13/726 701/301 |

(Continued)

FOREIGN PATENT DOCUMENTS

| EP | 2219151 A1 | 8/2010 |
| JP | 63-274286 A | 11/1988 |

(Continued)

Primary Examiner — Jared Walker
(74) Attorney, Agent, or Firm — Sughrue Mion, PLLC

(57) ABSTRACT

A vehicle surroundings monitoring apparatus includes a processing device. The processing device outputs a surrounding image as viewed from an eyepoint behind a host vehicle, including a current location of the host vehicle, to a display device mounted on the host vehicle on the basis of an image captured by a camera located a predetermined distance behind the current location of the host vehicle while the host vehicle is travelling forward or the host vehicle is stopped.

7 Claims, 7 Drawing Sheets

(56) References Cited

U.S. PATENT DOCUMENTS

| | | |
|---|---|---|
| 2010/0134519 A1 | 6/2010 | Yamada |
| 2011/0234802 A1* | 9/2011 | Yamada .................... B60R 1/00 348/148 |
| 2012/0069187 A1 | 3/2012 | Ozaki et al. |

FOREIGN PATENT DOCUMENTS

| | | |
|---|---|---|
| JP | 03-099952 A | 4/1991 |
| JP | 2001-21 81 97 A | 8/2001 |
| JP | 2002-120675 A | 4/2002 |
| JP | 2010-130673 A | 6/2010 |
| JP | 2010-274813 A | 12/2010 |

* cited by examiner

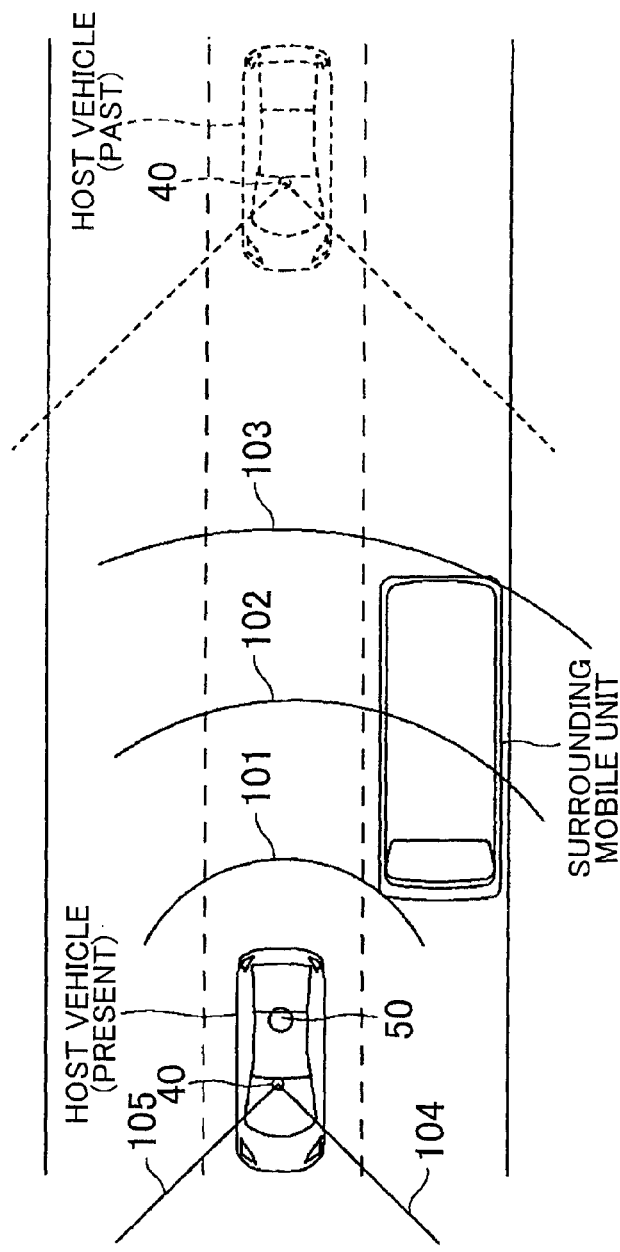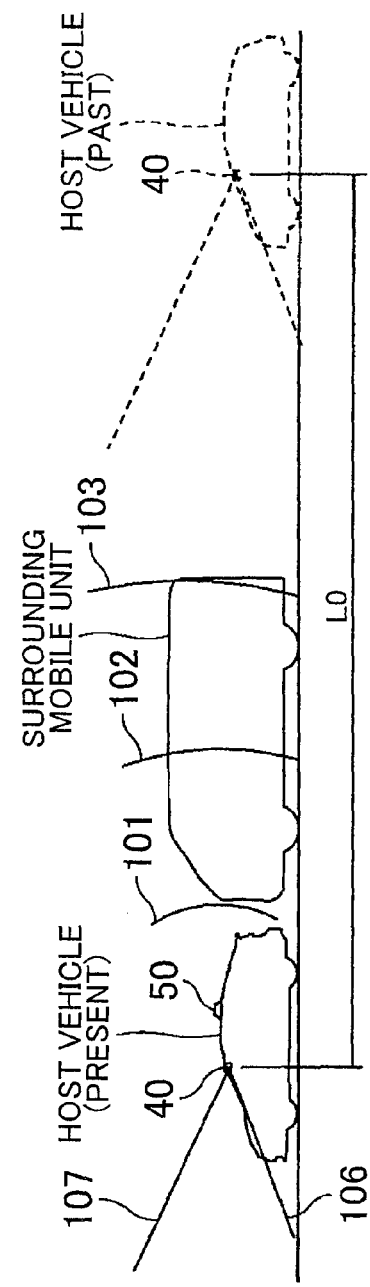
F I G. 6A
F I G. 6B

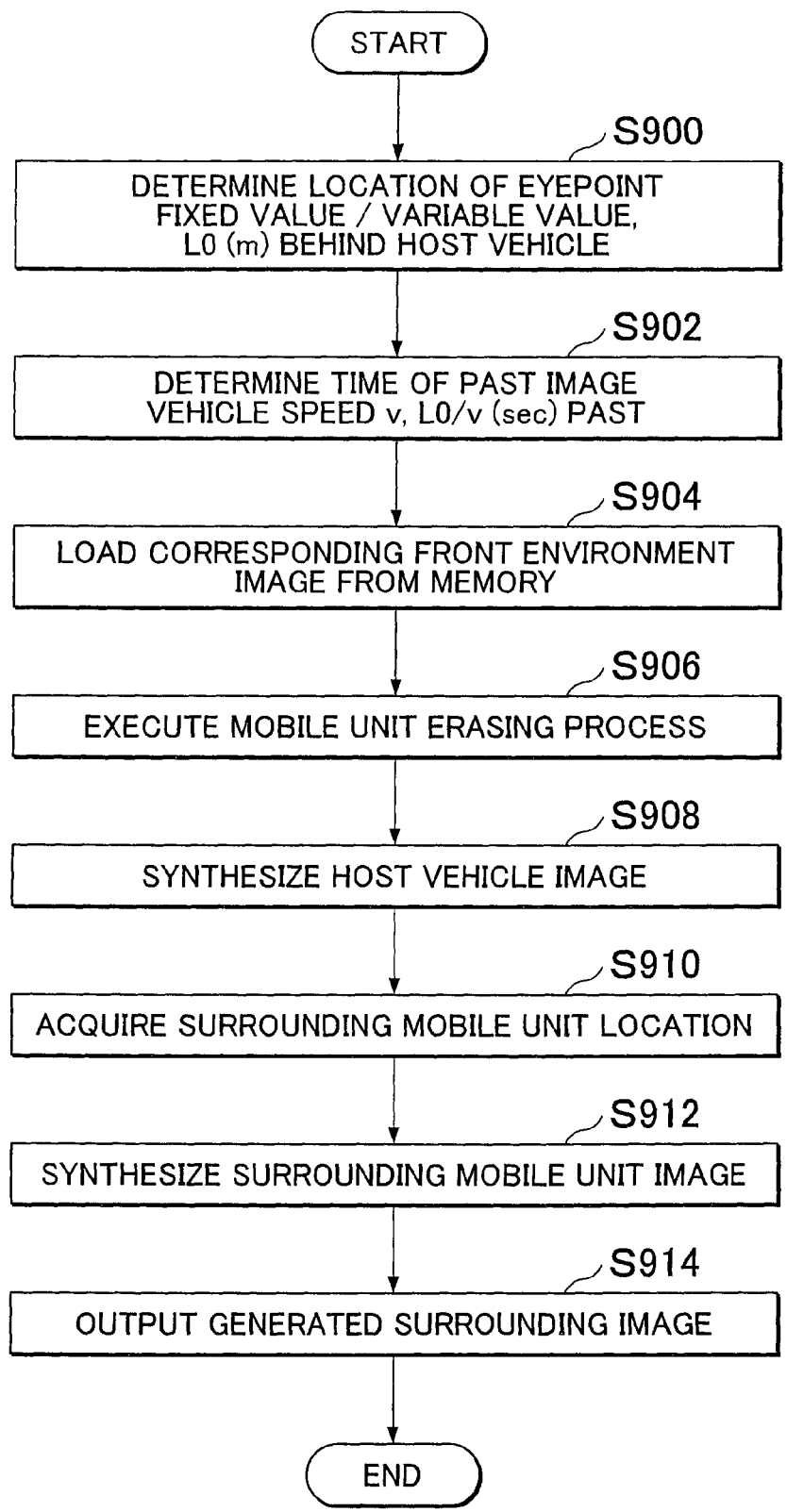

VEHICLE SURROUNDINGS MONITORING APPARATUS AND VEHICLE SURROUNDINGS MONITORING METHOD

BACKGROUND OF THE INVENTION

1. Field of the Invention

The invention relates to a vehicle surroundings monitoring apparatus and a vehicle surroundings monitoring method.

2. Description of Related Art

There is known an existing image generating device that generates a synthetic image on the basis of images captured by a plurality of cameras mounted on a vehicle and that shows the synthetic image on a display in a vehicle cabin (for example, see Japanese Patent Application Publication No. 2010-274813 (JP 2010-274813 A)). With the configuration described in JP 2010-274813 A, a display image that includes a synthetic image as viewed from a virtual eyepoint is shown on the display. The virtual eyepoint is set at an arbitrary eyepoint location around the vehicle so as to be oriented in an arbitrary viewing direction.

In addition, there is known a technique for showing an image, captured from a host vehicle, on a rear-view mirror (for example, see Japanese Patent Application Publication No. 63-274286 (JP 63-274286 A)).

However, with the configuration described in JP 2010-274813 A, a synthetic image to be shown on the display is generated by using images captured at present by the cameras mounted on the host vehicle at a current location of the host vehicle, so it is difficult to obtain a synthetic image that is able to widely show an area behind the host vehicle. That is, a synthetic image is generated on the basis of images captured at present by the cameras located at a current location of the host vehicle, so the amount of information about an area behind the vehicle is poor.

On the other hand, when an image of a camera (back camera) oriented rearward of the vehicle is used, it is possible to increase the amount of information about an area behind the vehicle. However, when such a rear-view image is directly shown, the direction of flow of an environment in the display image is opposite to the direction of flow of an environment ahead of the host vehicle, directly visually recognized by a driver through a front windshield. Therefore, it is difficult for the driver to instantaneously intuitively understand a surrounding situation mainly an area behind the vehicle. In addition, it is difficult for the angle of view of a camera oriented rearward of the vehicle to acquire information about the vision of the side, oblique rear, or the like, of the vehicle. In addition, when a synthetic image as viewed from a virtual eyepoint oriented forward from a location rearward of the vehicle is generated by using an image captured by a rearward-oriented camera by applying the technique described in JP 2010-274813 A, it is predicted that the synthetic image becomes unrecognizable (unnatural) due to a distortion, or the like, of an image as a result of eyepoint conversion or a range of usage of a rear-view image needs to be reduced eventually.

SUMMARY OF THE INVENTION

The invention provides a vehicle surroundings monitoring apparatus and a vehicle surroundings monitoring method that are able to output a natural image by which a driver is allowed to intuitively understand a surrounding situation mainly an area behind a vehicle.

A first aspect of the invention relates to a vehicle surroundings monitoring apparatus. The vehicle surroundings monitoring apparatus includes: a camera; a display device that is mounted on a vehicle; and a processing device that is mounted on the vehicle, wherein, while the vehicle is travelling forward or the vehicle is stopped, the processing device outputs a surrounding image as viewed from an eyepoint behind the vehicle, including a current location of the vehicle, to the display device on the basis of an image (hereinafter, referred to as a surrounding image) captured by the camera at a location that is a predetermined distance behind the current location of the vehicle.

A second aspect of the invention relates to a vehicle surroundings monitoring method. The vehicle surroundings monitoring method includes: acquiring a first image captured at a location that is a predetermined distance behind a current location of a vehicle; generating a surrounding image as viewed from an eyepoint behind the vehicle, including the current location of the vehicle, by using the first image; and showing the surrounding image while the vehicle is travelling forward or the vehicle is stopped.

According to the first and second aspects of the invention, it is possible to output a natural image by which a driver is able to intuitively understand a situation around the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A is a plan view that schematically shows a situation in which a host vehicle and a surrounding mobile unit are travelling;

FIG. 6B is a side view that schematically shows a situation in which the host vehicle and the surrounding mobile unit are travelling;

FIG. 9 is a flowchart that shows an example of main processes that may be executed by a processing device of the vehicle surroundings monitoring apparatus shown in FIG. 5.

DETAILED DESCRIPTION OF EMBODIMENTS

Embodiments of the invention will be described with reference to the accompanying drawings.

Figure 1:
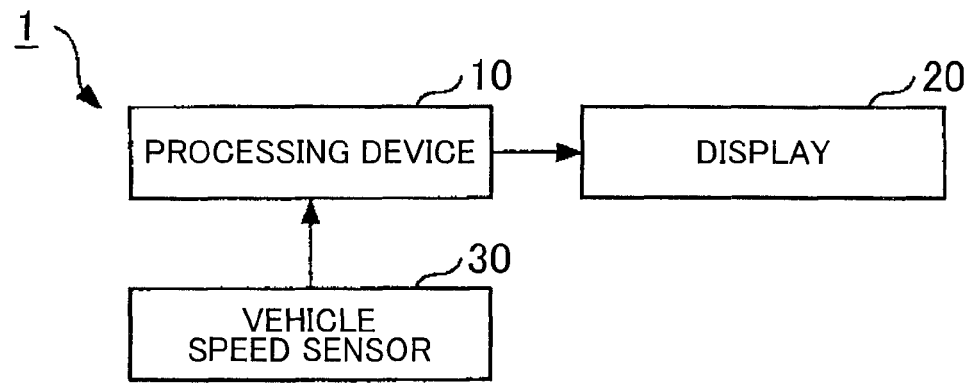
FIG. 1 is a view that shows an example of the basic configuration of a vehicle surroundings monitoring apparatus of the invention.

FIG. 1 is a view that shows the basic configuration of a vehicle surroundings monitoring apparatus 1. The vehicle surroundings monitoring apparatus 1 is mounted on a vehicle. The vehicle surroundings monitoring apparatus 1 includes a processing device 10.

The processing device 10 may be formed of an arithmetic processing device that includes a CPU. The function of the processing device 10 may be implemented by any hardware, software, firmware or a combination of them. For example, selected part or whole of the function of the processing device 10 may be implemented by an application-specific integrated circuit (ASIC) for specific application, a field programmable gate array (FPGA) or a digital signal processor (DSP). In addition, the processing device 10 may be implemented by a plurality of processing devices.

A display 20 is connected to the processing device 10. Note that the processing device 10 may be connected to the display 20 in a wired or wireless manner. In addition, the processing device 10 may be connected to the display 20 directly or indirectly via another device. In addition, part or whole of the function of the processing device 10 may be implemented by a processing device (not shown) provided in the display 20.

The display 20 may be any display device, such as a liquid crystal display and a head up display (HUD). The display 20 is arranged at an appropriate location in a vehicle cabin (for example, the center lower side of an instrument panel).

A vehicle speed sensor 30 is connected to the processing device 10. The vehicle speed sensor 30 detects a vehicle speed. The processing device 10 may be connected to the vehicle speed sensor 30 in a wired or wireless manner. In addition, the processing device 10 may be connected to the vehicle speed sensor 30 directly or indirectly via another device.

While a host vehicle is travelling forward, the processing device 10 outputs an image (hereinafter, referred to as surrounding image) as viewed toward the host vehicle from an eyepoint behind the host vehicle, including a current location of the host vehicle, to the display 20 on the basis of an image at the current location of the host vehicle, captured by a camera located a predetermined distance L0 behind the current location of the host vehicle.

The predetermined distance L0 corresponds to a distance from the host vehicle to the eyepoint behind the host vehicle, and is a parameter related to a relative location of the eyepoint. The predetermined distance L0 may be selected. The predetermined distance L0 may be a fixed value (for example, 30 m, or the like) or may be a variable value. In addition, the predetermined distance L0 may be changed on the basis of a vehicle speed, a road property, such as an ordinary road and an expressway, and a legal speed. For example, the predetermined distance L0 may be set so as to be shorter when the vehicle speed of the host vehicle is relatively low than when the vehicle speed is relatively high. In addition, the predetermined distance L0 may be a maximum value of a variable value or fixed value set as described above.

It may be determined on the basis of an output from the vehicle speed sensor 30 whether the host vehicle is travelling forward. In addition to or instead of an output from the vehicle speed sensor 30, information about a change in the location of the host vehicle, obtained from a global positioning system (GPS), a rotational state of an output shaft of a transmission, or the like, may be used. In addition, it may be determined using information about the position of a shift gear (D range, R range, or the like), an operation amount of an accelerator pedal (throttle opening degree), or the like, whether the host vehicle is travelling forward. Note that the processing device 10 may output a similar surrounding image to the display 20 while the vehicle is stopped in addition to while the host vehicle is travelling forward. That is, the processing device 10 may be configured not to output a surrounding image to the display 20 while the host vehicle is travelling backward. With the above configuration, information from the vehicle speed sensor 30 is substantially not necessary, and information about the position of the shift gear may be utilized. In addition, the processing device 10 may switch between a mode in which a surrounding image is output to the display 20 and a mode in which another piece of information (TV, a map display for navigation, or the like) is shown on the display 20 on the basis of a command (for example, switch operation or shift operation) from a user.

Figure 2:
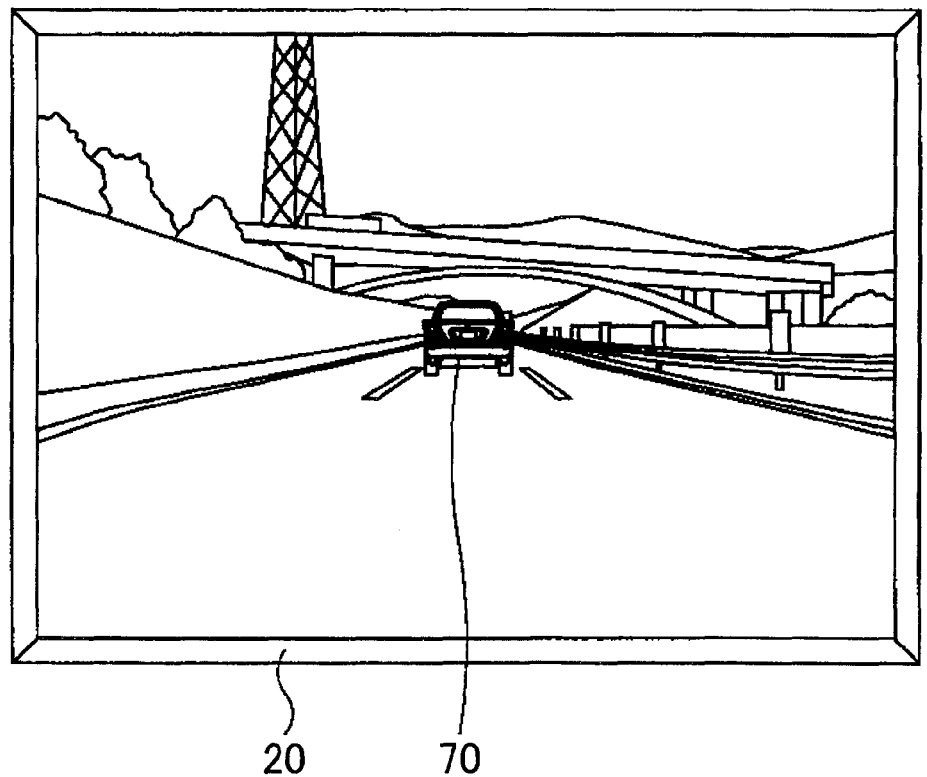
FIG. 2 is a view that shows an example of a forward image from behind a host vehicle.

FIG. 2 is a view that shows an example of a surrounding image.

The surrounding image is an image as viewed toward the host vehicle from an eyepoint behind the host vehicle, and includes a host vehicle image 70 that shows the host vehicle.

There are various methods of generating a surrounding image.

For example, a camera may be a front-view camera (camera that captures an area ahead of the host vehicle) mounted on the host vehicle. In this case, the camera located the predetermined distance L0 behind the current location of the host vehicle is a front-view camera when the vehicle was located the predetermined distance L0 behind the current location of the host vehicle. Thus, an image captured by the front-view camera when the vehicle was located the predetermined distance L0 behind the current location of the host vehicle is an image captured in the past from the present time (hereinafter, also referred to as "past image"). The host vehicle is not included in the past image. Thus, the surrounding image is generated by synthesizing (superimposing) the host vehicle image 70 with (on) the past image. A position and size of the host vehicle image 70 synthesized with the past image may be determined on the basis of a relative distance between the current location of the host vehicle (for example, host vehicle location obtained from the GPS) and the location of the host vehicle at the time when the past image was captured (the predetermined distance L0 and a lateral positional relationship), the optical axis direction of the front-view camera, the direction of the host vehicle at the time when the past image was captured, and the like. The host vehicle image 70 to be synthesized may be generated in advance so as to show the back view of the host vehicle because the type of the host vehicle is known. Note that the size of the host vehicle image 70 to be synthesized with the past image may be constant when the predetermined distance L0 is a fixed value and may be changed (reduced or enlarged) on the basis of the predetermined distance L0 when the predetermined distance L0 is a variable value. In addition, the host vehicle image 70 to be synthesized with the past image may be fixed such that the vehicle is viewed from behind along a road separation line (lane) or may be changed such that the vehicle is viewed from a different angle on the basis of a relative angle between the direction of the host vehicle at the time when the past image was captured and the current direction of the host vehicle.

In addition, the camera may be a roadside camera that is installed at a roadside and that captures an area ahead in a vehicle travelling direction. The capturing direction is not limited to a horizontal direction. An area ahead in the vehicle travelling direction may be, for example, captured such that the camera is oriented obliquely downward or obliquely upward. The roadside camera may be, for example, arranged at predetermined distance intervals on a road. The roadside camera may be installed at a road shoulder or may be installed directly above a road. In this case, the processing device 10 may acquire a captured image from the roadside camera through communication (for example, road-to-vehicle communication). The captured image to be acquired may be an image captured by the roadside camera when the host vehicle is located the predetermined distance L0 ahead of the roadside camera (that is, an image at the present time). In this case, the captured image to be acquired includes the host vehicle (that is, the host vehicle image 70 shows an actually captured host vehicle). Alternatively, the captured image to be acquired may be an image at any time, which does not include the host vehicle (that is, a past image). In this case, the surrounding image is generated by synthesizing the host vehicle image 70 with the past image on the basis of a relative positional relationship between the current location of the host vehicle and the location of the roadside camera, and the like.

Note that, in the case where the camera is a roadside camera, if the predetermined distance L0 is fixed, it is not possible to seamlessly (continuously) output a surrounding image, and, depending on an interval at which the roadside camera is installed, each time the host vehicle is located the predetermined distance L0 ahead of a new roadside camera, the surrounding image is changed (updated) on the basis of an image from the new roadside camera. On the other hand, when the predetermined distance L0 is a selected distance (distance between the host vehicle and the roadside camera at that time), by continuously acquiring an image from the roadside camera while changing the roadside camera as the host vehicle moves, it is possible to continuously output a surrounding image as long as the host vehicle is captured by at least any one of the roadside cameras. In addition, even when the host vehicle is not captured by a roadside camera, by synthesizing the host vehicle image 70 with a past image at a location according to a change of the location of the host vehicle, it is possible to continuously output a surrounding image.

In addition, the camera may be a front-view camera mounted on another vehicle that travels behind the host vehicle (hereinafter, referred to as other-vehicle camera). In this case, the processing device 10 may acquire an image, captured by an other-vehicle camera, from the other-vehicle camera through communication (for example, inter-vehicle communication). The captured image to be acquired may be an image captured by the other-vehicle camera when the host vehicle is located the predetermined distance L0 ahead of the other-vehicle camera (that is, a current image). In this case, the captured image to be acquired includes the host vehicle (that is, the captured image includes the host vehicle image 70). Alternatively, the captured image to be acquired may be an image in a positional relationship that the host vehicle is not captured by the other-vehicle camera (that is, a past image). In this case, a surrounding image is generated by synthesizing the host vehicle image 70 with the past image on the basis of a relative positional relationship between the current location of the host vehicle and the location at which the image is captured by the other-vehicle camera.

Note that, in the case where the camera is an other-vehicle camera, if the predetermined distance L0 is fixed, it is not possible to seamlessly (continuously) output a surrounding image, and, depending on a positional relationship between the host vehicle and another vehicle, a surrounding image is changed (updated) at irregular timing at which the another vehicle comes to the location the predetermined distance L0 behind the host vehicle. On the other hand, when the predetermined distance L0 is a selected distance (distance between the host vehicle and the other-vehicle camera at that time), as long as the host vehicle is captured by the other-vehicle camera, it is possible to continuously output a surrounding image by continuously acquiring an image from the other-vehicle camera. In addition, even when the host vehicle is not captured by the other-vehicle camera, by synthesizing the host vehicle image 70 with the past image at a location according to a change of the location of the host vehicle, it is possible to continuously output a surrounding image.

In addition, the camera may be a front-view camera mounted on a specific vehicle such as a probe car (hereinafter, referred to as probe car camera). An image captured by the probe car camera is utilized to generate map data (for example, a 3D map for navigation), a street view, or the like, by being associated with captured positional information. A surrounding image may be generated on the basis of an image captured by such a probe car camera or data created on the basis of the captured image. The image utilized to generate a surrounding image may be an image captured at a location that is the predetermined distance L0 behind the current location of the host vehicle. In this case, the image captured by the probe car camera is an image captured in the past with respect to the present time, and does not include the host vehicle. Thus, in this case, the surrounding image is generated by synthesizing the host vehicle image 70 with the acquired image. A position and size of the host vehicle image 70 synthesized with the acquired image may be determined on the basis of a relative positional relationship between the current location of the host vehicle and the location at which the acquired image is captured, the optical axis direction of the probe car camera, and the like.

In addition, the surrounding image may be an image drawn with the use of computer graphics (CG) (for example, a 3D map image for a navigation system). In this case, the surrounding image is, for example, generated on the basis of an image from the probe car camera mounted on a specific vehicle, such as the above described probe car. This is because an image drawn with the use of CG is generated from an actual image acquired by the camera.

Figure 3:
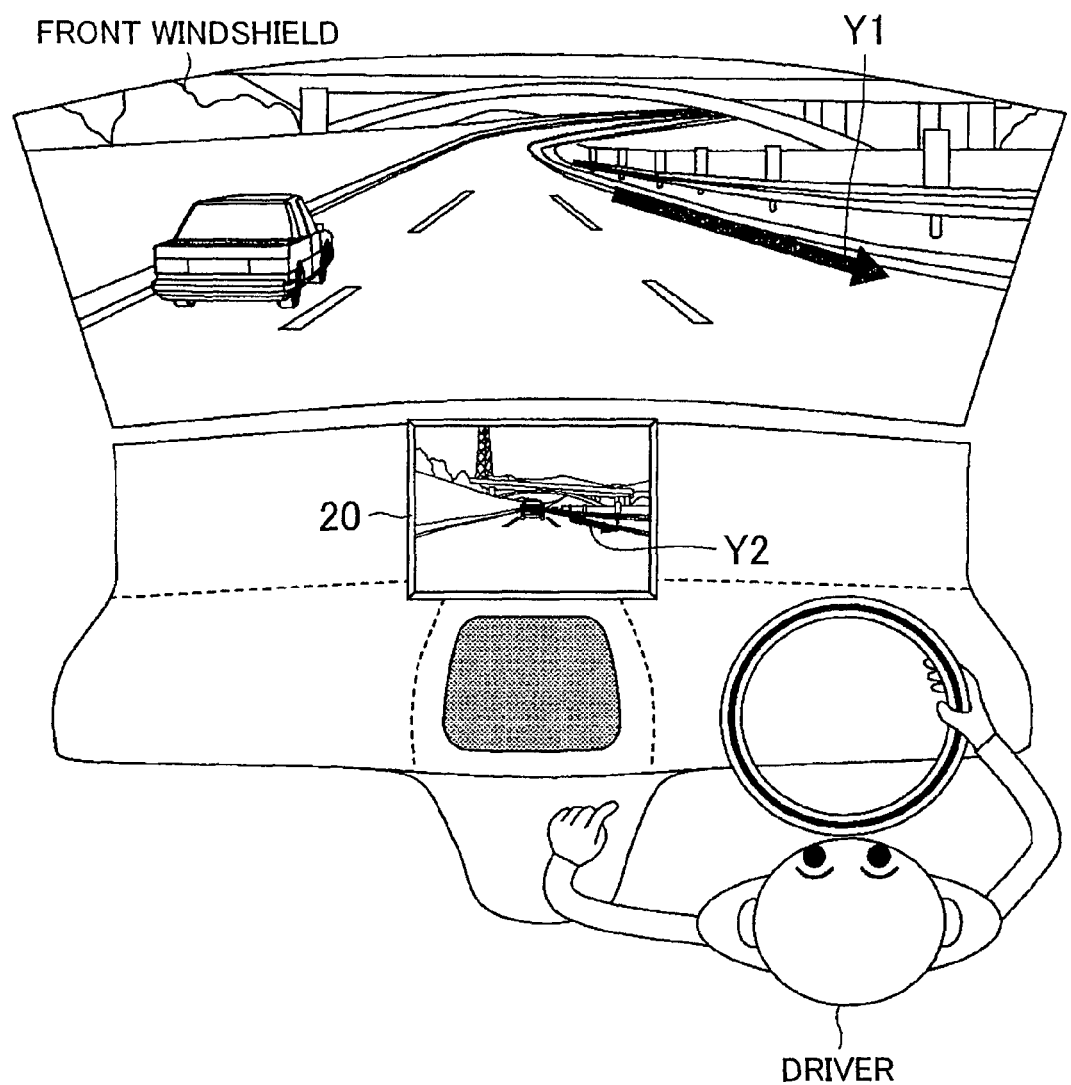
FIG. 3 is a view that schematically shows a state where a surrounding image is provided for a driver by the vehicle surroundings monitoring apparatus.

FIG. 3 is a view that schematically shows a state where a surrounding image is provided for a driver by the vehicle surroundings monitoring apparatus 1.

In the illustrated example, the display 20 is provided at the center portion of an instrument panel. The display 20 may be provided at another position ahead of the driver (for example, an upper position, such as a rear-view mirror). While the host vehicle is travelling forward, an environment ahead of the host vehicle, directly visually recognized by the driver via a, front windshield, flows in a direction indicated by the arrow Y1 in FIG. 3. At this time, an environment behind the host vehicle, visually recognized by the driver via the display 20, also flows in a direction indicated by the arrow Y2 in FIG. 3. In this way, while the host vehicle is travelling forward, the direction of the flow of the environment ahead of the host vehicle, directly visually recognized by the driver via the front windshield, substantially coincides with the direction of the flow of the environment behind the host vehicle, visually recognized by the driver via the display 20. Thus, the environment ahead of the host vehicle and the environment behind the host vehicle move in the same direction, so it is easy for the driver to intuitively instantaneously understand a surrounding environment. By so doing, it is possible to reduce distractions while driving.

In addition, a surrounding image to be output to the display 20 is generated on the basis of the image captured by the camera located the predetermined distance L0 behind the current location of the host vehicle. By using the image captured by the camera located the predetermined distance L0 behind the current location of the host vehicle, it is possible to generate the surrounding image in a further visually recognizable mode. It is possible to generate a surrounding image by which a surrounding environment is more easily intuitively understandable as the optical axis direction of the camera gets close to the front direction of the driver. Thus, the camera is desirably a front-view camera that is compatible with the front direction of the driver.

In addition, when a surrounding image to be output to the display 20 is generated on the basis of the image captured by the front-view camera, in comparison with the case where an image captured by a rear-view camera or an image captured by a side-view camera is used, coordinate conversion process (eyepoint conversion process, or the like) is not necessary, so it is possible to reduce processing load. In addition, by appropriately setting the predetermined distance L0, it is possible to provide the driver with information within a desired distance behind the current location of the host vehicle.

Figure 4:
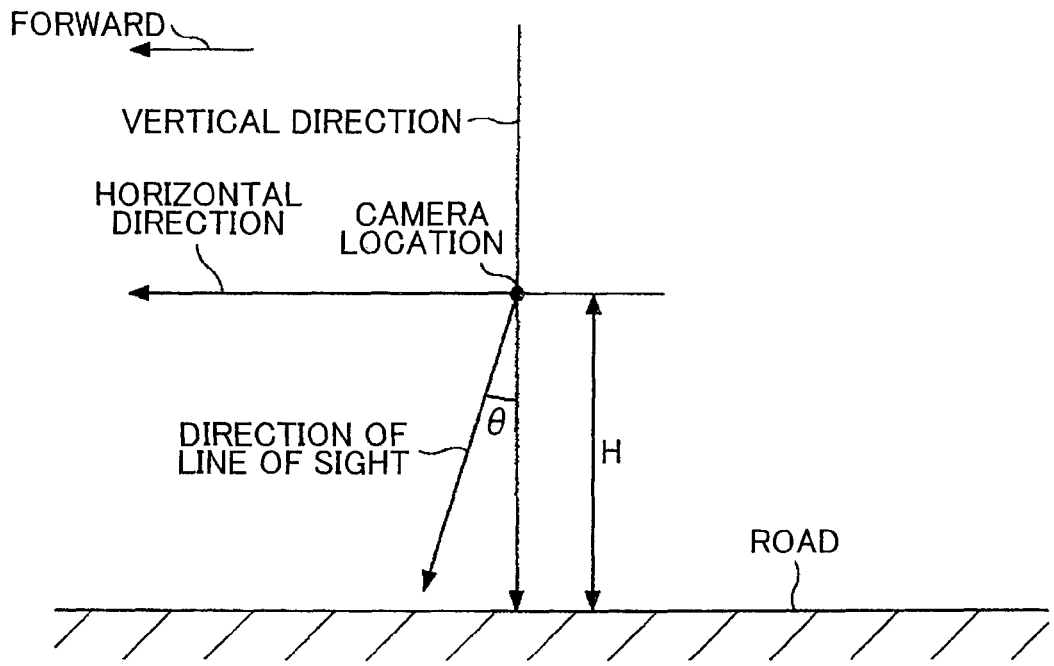
FIG. 4 is a view that illustrates a mode in which a camera is arranged.

FIG. 4 is a mode in which the camera is arranged. The height position of the camera is specified by a height H from a ground (road), and the direction of the line of sight (optical axis direction) of the camera is specified by an angle θ made with respect to a vertical direction. The angle θ is positive when the direction of the line of sight is forward with respect to the vertical direction and is negative when the direction of the line of sight is rearward with respect to the vertical direction. Note that the direction of the line of sight of the camera within a horizontal plane is typically a forward direction and may be a direction that is not an immediately lateral direction.

In the present embodiment, "the camera that captures an area ahead (front-view camera, roadside camera, or the like)" is used, and "the camera that captures an area ahead" is desirably a camera that captures an area ahead in a mode in which the angle θ is substantially 90 degrees. That is, the eyepoint of the camera desirably substantially coincides with the front direction of the driver. The camera may be a camera mounted on a vehicle (including the host vehicle and another vehicle). By so doing, it is possible to substantially bring the mode of the flow (flow direction and speed) of an environment behind the host vehicle, visually recognized by the driver via the display 20, into coincidence with the mode of the flow of an environment ahead of the host vehicle, directly visually recognized by the driver via the front windshield. However, for example, in the case of a roadside camera that captures an image from above a vehicle (that is, in the case where the height H is significantly larger than the height of the vehicle), "the camera that captures an area ahead" may include a camera that captures an area ahead in a mode in which the angle θ is smaller than 90 degrees.

In addition, the surrounding image may be an image in the same direction of the line of sight as the camera or may be an image of which the direction of the line of sight is changed through coordinate conversion process. In this case, the surrounding image is desirably generated so as to correspond to the case where the host vehicle is viewed from behind in the front direction of the driver. That is, the surrounding image is an image in a direction corresponding to a substantially horizontal direction of the line of sight. By so doing, it is possible to substantially bring the mode of the flow (flow direction and speed) of an environment behind the host vehicle, visually recognized by the driver via the display 20, into coincidence with the mode of the flow of an environment ahead of the host vehicle, directly visually recognized by the driver via the front windshield. However, an environment in the surrounding image just needs to flow from forward to rearward (see the arrow Y2 in FIG. 3) while the host vehicle is travelling forward, and the flow speed at that time may be significantly slower than the flow speed of the environment ahead of the host vehicle, directly visually recognized by the driver via the front windshield. In addition, the surrounding image just needs to be not a bird's-eye-view or rear-view image (image in a direction corresponding to the direction of the line of sight in which the angle θ shown in FIG. 4 is zero or negative.

In addition, when a surrounding image is generated through coordinate conversion process, the camera does not always need to be a camera that captures an area ahead. For example, in the case of a roadside camera that captures an image from above a vehicle, a camera that is oriented immediately downward (camera of which the angle θ shown in FIG. 4 is zero) may be used or a camera that is oriented rearward (camera of which the angle θ shown in FIG. 4 is negative) may be used.

Next, an embodiment in the case where a front-view camera mounted on the host vehicle is used will be described with reference to FIG. 5 and the following drawings.

Figure 5:
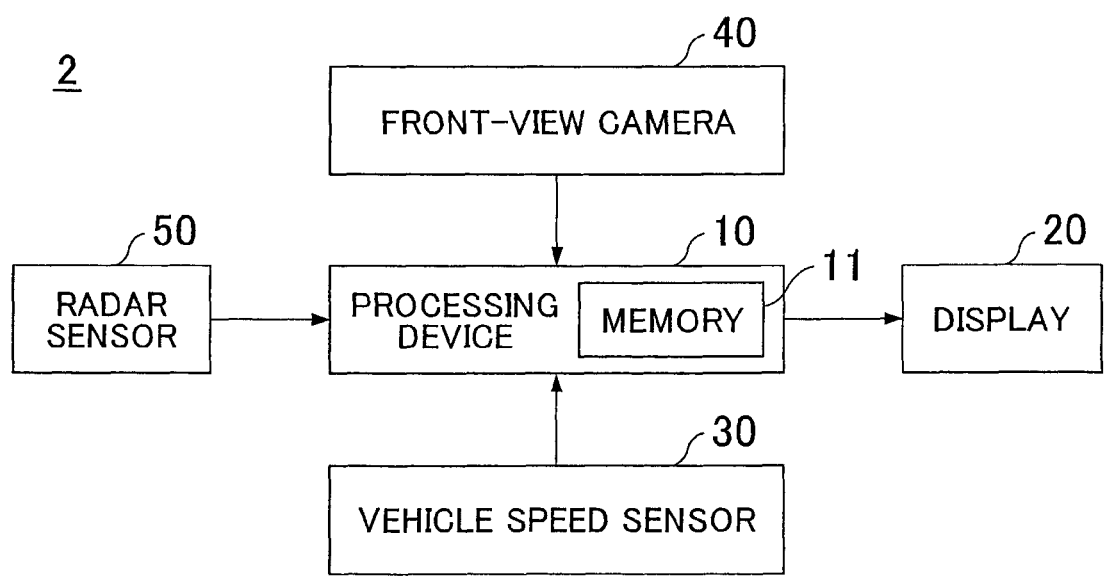
FIG. 5 is a view that shows an example of the configuration of a vehicle surroundings monitoring apparatus of the invention.

FIG. 5 shows an example of the configuration of a vehicle surroundings monitoring apparatus 2. The vehicle surroundings monitoring apparatus 2 shown in FIG. 5, as well as the basic configuration shown in FIG. 1, includes the processing device 10. In addition to the display 20 and the vehicle speed sensor 30, a front-view camera 40 is connected to the processing device 10. Note that the processing device 10 may be connected to the front-view camera 40 in a wired or wireless manner. In addition, the processing device 10 may be connected to the front-view camera 40 directly or indirectly via another device. In addition, part or whole of the function of the processing device 10 may be implemented by a processing device provided in the front-view camera 40.

The front-view camera 40 captures a scene ahead of the vehicle with the use of an imaging device, such as a charge-coupled device (CCD) and a complementary metal oxide semiconductor (CMOS), to acquire a front environment image. The front-view camera 40 may be a near-infrared camera provided for the purpose of night vision, or the like, or a visible-light camera that is able to acquire a color image. The front-view camera 40 may be installed at any site in the vehicle (for example, inside a vehicle cabin, outside the vehicle cabin, such as a position near a bumper of a vehicle body). The front-view camera 40 may be, for example, provided near the upper edge or lower edge of the front windshield. In addition, the front-view camera 40 may be attached to the back side (face on the front side of the vehicle) of the rear-view mirror. The front-view camera 40 may be an exclusive camera or may be a camera that is used in another application (for example, for a drive recorder, for lane keep assist control that includes white line recognition process, or for pedestrian detection). The front-view camera 40 may be configured to acquire a front environment image in real-time while the vehicle is travelling and supply the front environment image to the processing device 10 in stream format having a predetermined frame period. Note that the front environment image may be supplied to the processing device 10 after being subjected to a predetermined process (for example, coordinate conversion process, or the like). By so doing, it is possible to reduce processing load on the processing device 10.

The processing device 10 stores time-sequence front environment images, supplied from the front-view camera 40, in a predetermined memory 11. Note that the front environment images may be stored such that front environment images for latest predetermined periods are stored in the memory 11 in a first-in first-out (FIFO) manner. The predetermined periods may be determined such that it is possible to load a front environment image (past image) captured by the front-view camera 40 at the time when the host vehicle was located the predetermined distance L0 behind the current location of the host vehicle.

A radar sensor 50 is connected to the processing device 10. Note that the processing device 10 may be connected to the radar sensor 50 in a wired or wireless manner. In addition, the processing device 10 may be connected to the radar sensor 50 directly or indirectly via another device. In addition, part or whole of the function of the processing device 10 may be implemented by a processing device provided in the radar sensor 50.

The radar sensor 50 detects the presence or state of a surrounding mobile unit (typically, a surrounding vehicle) around the host vehicle by using an electric wave (for example, millimeter wave), a light wave (for example, laser) or an ultrasonic wave as a detection wave. The radar sensor 50 detects information about a relative positional relationship between a surrounding mobile unit and the host vehicle, such as the relative velocity, relative distance and direction (lateral position) of the peripheral mobile unit with respect to the host vehicle at predetermined intervals. Note that, in the case where the radar sensor 50 is a millimeter-wave radar sensor, the millimeter-wave radar sensor may be, for example, an electronic scanning millimeter-wave radar. In this case, the relative velocity of the surrounding mobile unit is detected by using the Doppler frequency (frequency shift) of an electric wave, the relative distance of the surrounding mobile unit is detected by using a delay time of a reflected wave, and the direction of the surrounding mobile unit is detected on the basis of a phase difference in received wave between a plurality of receiving antennas. Note that the radar sensor 50 may also be used as a radar sensor for a pre-crash system, which is used to predict a collision with a surrounding mobile unit around the host vehicle, or may also be used as a radar sensor for lane change assist control. Data detected by the radar sensor 50 is transmitted to the processing device 10 at predetermined intervals.

The processing device 10 detects the relative relationship (relative velocity, distance, direction, and the like) of the host vehicle with respect to the surrounding mobile unit by using information obtained from the radar sensor 50, and superimposes (synthesizes) an image that shows the surrounding mobile unit (surrounding mobile unit image) on (with) the front environment image on the basis of the detected result. By so doing, the processing device 10 generates a surrounding image. The processing device 10 shows the generated surrounding image on the display 20. The surrounding image is generated by sequentially acquiring an appropriate past image from the memory 11, and is updated and shown in real-time.

Here, the front environment image used to generate a surrounding image is the past front environment image (past image) stored in the memory 11. That is, the front environment image used to generate a surrounding image is an image of an area ahead, captured by the camera located the predetermined distance L0 behind the current location of the host vehicle. In the case of the front-view camera 40 mounted on the host vehicle, the front environment image is a front environment image captured by the front-view camera 40 at the time when the host vehicle passed through a point that is the predetermined distance L0 behind the current location of the host vehicle.

FIG. 6A and FIG. 6B show a situation that the host vehicle and the surrounding mobile unit are travelling. FIG. 6A shows a plan view. FIG. 6B shows a side view. FIG. 6A and FIG. 6B show examples of the location of the front-view camera 40 at the time of acquiring the front environment image used to generate a surrounding image, and the surrounding mobile unit to be synthesized with the surrounding image. Note that, in FIG. 6A and FIG. 6B, the reference numerals 101 to 103 schematically indicate detection waves from the radar sensor 50, and the reference numerals 104 to 107 schematically indicate an example of the capturing range (angle of view) of the front-view camera 40.

In FIG. 6A and FIG. 6B, the host vehicle at the present time is drawn by continuous line, and the host vehicle before the present time (host vehicle when located the predetermined distance L0 behind the current location of the host vehicle) is indicated by dashed line. The front environment image used to generate a surrounding image to be shown at the present time is a front environment image obtained at the location of the dashed host vehicle (the location of the front-view camera 40), and is loaded from the memory 11. For example, on the basis of a current vehicle speed v (m/s) and the predetermined distance L0 (m), a front environment image captured L0/v (s) before the present time is used. Note that the vehicle speed may not be constant, so an average value may be used. In addition, at this time, the history of host vehicle location information obtained from the GPS may be utilized. However, as described above, the predetermined distance L0 does not need to be constant, so the front environment image corresponding to the location that is the predetermined distance L0 behind does not need to be loaded from the memory 11 with strict accuracy. Thus, in an embodiment, a front environment image that is a constant predetermined frame period before a current frame period may be utilized. In this case, a travel distance of the host vehicle from the current frame period to the time the predetermined frame period before substantially corresponds to the predetermined distance L0. Thus, the predetermined distance L0 is variable on the basis of a travel mode (particularly, vehicle speed) during then.

Figure 7A:
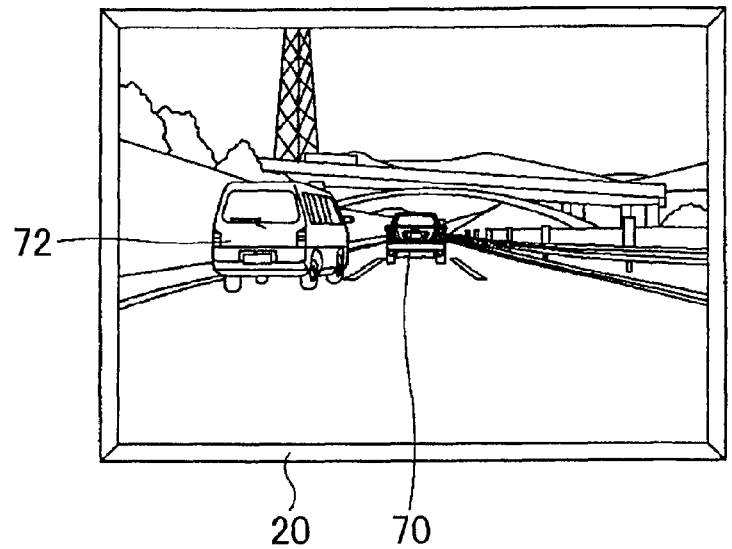
FIG. 7A is a view that shows an example of a front environment image that includes a surrounding mobile unit image synthesized with the use of CG.
Figure 7B:
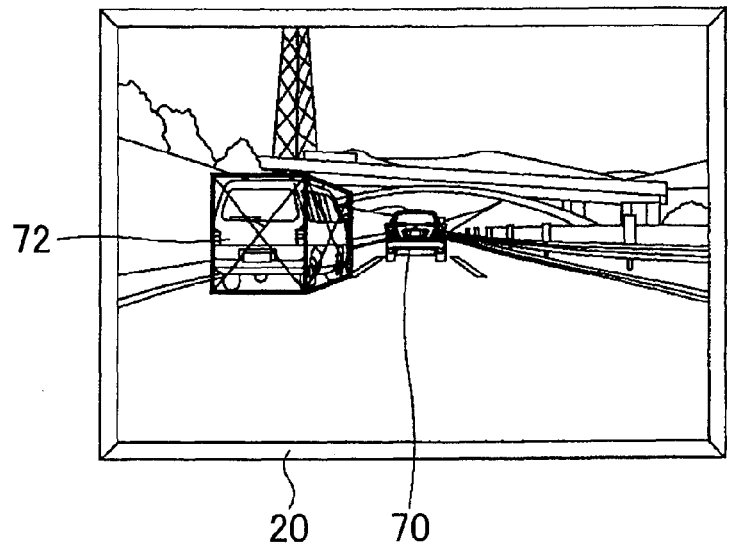
FIG. 7B is a view that shows an example of a front environment image that includes a surrounding mobile unit image synthesized with the use of CG and wire frame.
Figure 7C:
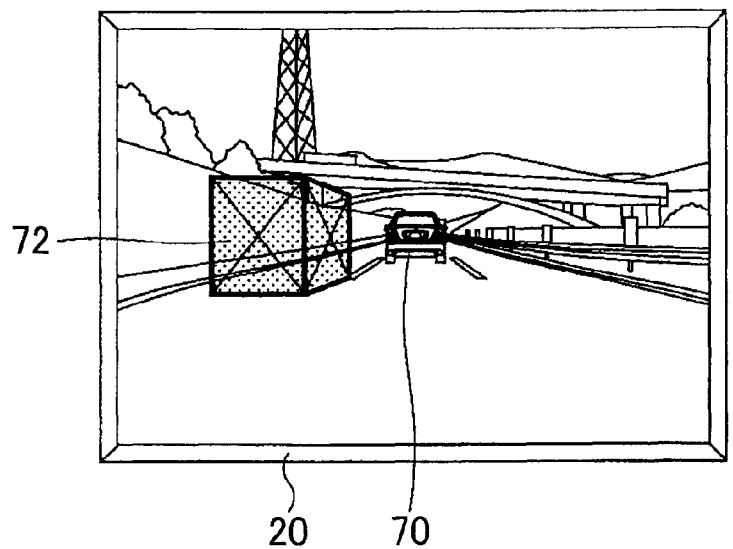
FIG. 7C is a view that shows an example of a front environment image that includes a surrounding mobile unit image synthesized with the use of wire frame.

FIG. 7A, FIG. 7B and FIG. 7C are views that respectively show a plurality of examples of a front environment image that includes a synthesized surrounding mobile unit image. FIG. 7A, FIG. 7B and FIG. 7C respectively show a plurality of examples of a front environment image generated in correspondence with the situation shown in FIG. 6A and FIG. 6B. In FIG. 7A, FIG. 7B and FIG. 7C, the above-described host vehicle image 70 is shown, and the surrounding mobile unit image is indicated by the reference numeral 72. Note that, in FIG. 7A, FIG. 7B and FIG. 7C, assuming that there is no substantial change of the direction of the vehicle from the time at which the front environment image is acquired to the present time (that is, the case where the vehicle is continuously travelling straight ahead), the host vehicle image 70 is synthesized at a position that covers a front vanishing point as in the case of the example shown in FIG. 3.

A position and size of the surrounding mobile unit image 72 to be synthesized with the front environment image may be determined on the basis of a current relative positional relationship between the surrounding mobile unit and the host vehicle, and, furthermore, the optical axis direction, and the like, of the front-view camera 40 may be taken into consideration. That is, the processing device 10 may calculate a synthesized position (pixel position) of the surrounding mobile unit image 72 by using a predetermined transformation (a relational expression between a position in an actual space and pixel positions in the front environment image) that is determined in advance in consideration of the optical axis direction; and the like, of the front-view camera 40 on the basis of a relative positional relationship between the surrounding mobile unit and the host vehicle. In addition, as in the case of the host vehicle image 70, the size of the surrounding mobile unit image 72 in the front environment image may be reduced or enlarged on the basis of a relative relationship between the current location of the surrounding mobile unit and the location of the host vehicle at the time when the front environment image to be used was acquired. In addition, the surrounding mobile unit image 72 to be synthesized with the front environment image may be such that the vehicle is viewed from behind along a road separation line direction or a host vehicle travelling direction or may be changed such that the vehicle is viewed from a different angle on the basis of information obtained from the radar sensor 50.

The surrounding mobile unit image 72 to be synthesized may be any image. For example, the surrounding mobile unit image 72 may be generated on the basis of the property (type, size, shape, color, and the like) of the surrounding mobile unit. For example, the property of the surrounding mobile unit may be acquired through inter-vehicle communication or road-to-vehicle communication (communication with infrastructure). In addition, the size and shape of the surrounding mobile unit may be acquired on the basis of information (a range in which the surrounding mobile unit is present and the amount of electric wave reflected) from the radar sensor 50. When the property of the surrounding mobile unit is acquired, for example, the surrounding mobile unit image 72 prepared for each property of the surrounding mobile unit may be used. As shown in FIG. 7A, the surrounding mobile unit image 72 may be, for example, generated by drawing with the use of CG. By so doing, it is possible to output a further real surrounding mobile unit image 72. In addition, in consideration of the fact that the surrounding mobile unit image 72 is actually not an image captured by the front-view camera 40, the surrounding mobile unit image 72 may be generated by a combination of drawing with the use of CG and wire frame as shown in FIG. 7B. By so doing, while a more real surrounding mobile unit image 72 is output, it is possible to notify the driver that the surrounding mobile unit indicated by the surrounding mobile unit image 72 is a virtual image and is not an actual image (an image of a real surrounding mobile unit), that is, an image different from that of the real surrounding mobile unit is drawn. In addition, the property of the surrounding mobile unit does not need to be acquired. In this case, the surrounding mobile unit image 72 may be expressed only by wire frame as shown in FIG. 7C. In addition, a display mode may be changed on the basis of whether there is property information of the surrounding mobile unit and driver's setting operation.

By showing the front environment image, which includes the thus synthesized surrounding mobile unit image, on the display 20, the driver is able to easily understand a situation of another vehicle (including a motorcycle and a bicycle) approaching the host vehicle and another vehicle at a less-visible location in a blind angle.

Here, the front environment image used to generate a surrounding image is a past image as described above. The past image may include an image of a surrounding mobile unit that is not present around the host vehicle at the present time. Thus, the processing device 10 may execute mobile unit erasing process on the front environment image. Note that the mobile unit erasing process may be executed before the front environment image is stored in the memory 11 or when the front environment image is acquired from the memory 11 and then a surrounding image is generated. Note that discrimination of the surrounding mobile unit from a fixed object, required for mobile unit erasing process, may be a general method in moving image compression recording, such as moving picture experts group (MPEG). In addition, the above mobile unit erasing process itself is considerably light, and is able to be executed in real-time.

Figure 8:
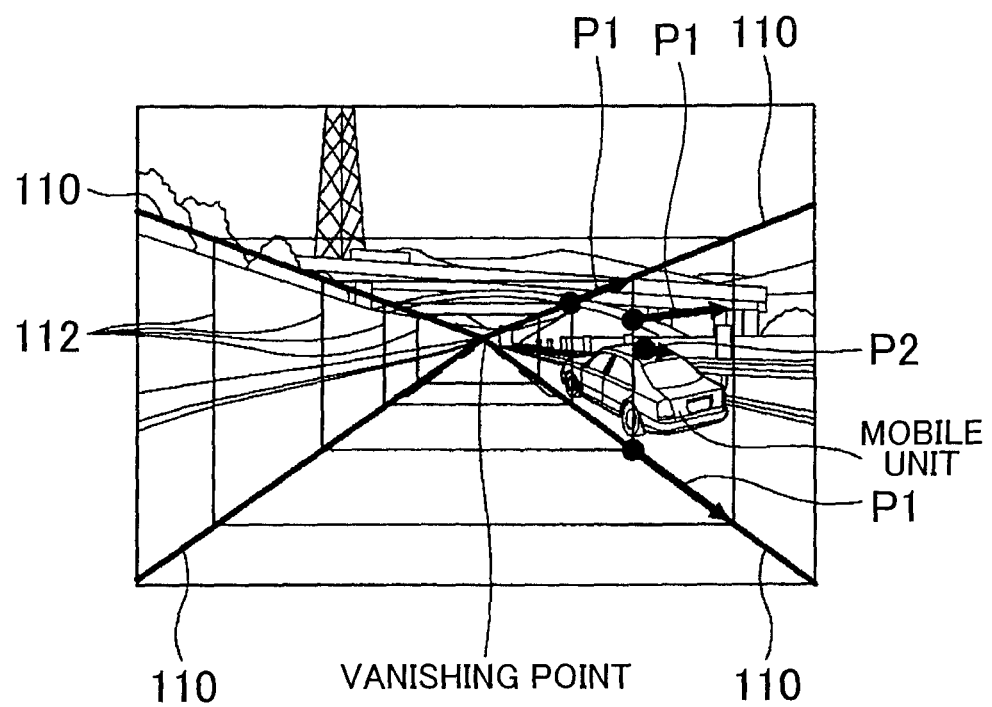
FIG. 8 is a view that shows an example of mobile unit erasing process.

FIG. 8 is an example of the mobile unit erasing process. FIG. 8 shows an example of the front environment image from the front-view camera 40. In FIG. 8, for the sake of easy illustration, four line segments (not actual images) 110 extend radially from the front vanishing point. In addition, these four line segments 110 are divided by line segments 112 (partially omitted) (not actual images) at equal distance intervals in the image.

In a moving image (a plurality of successive frames) of the front environment image, generally, a fixed object or a substantially fixed object that is sufficiently lower in speed than the travel speed of the host vehicle moves with a moving vector (see P1 in FIG. 8) based on its location (the location from the front-view camera 40) along the line segments 110 extending radially from the front vanishing point. On the other hand, a surrounding mobile unit, such as a travelling vehicle, moves with a resultant vector (see P2 in FIG. 8) of a vector along the line segments 110 extending radially from the front vanishing point and a moving vector of the surrounding mobile unit itself. Thus, by utilizing the difference of movement (vector) in a moving image of the front environment image, it is possible to easily discriminate the surrounding mobile unit from a fixed object (or a substantially fixed object). Thus, as the mobile unit erasing process, the processing device 10 just needs to compare between the frames of the front environment image, leave only an image range of a fixed object (or substantially fixed object) and erase the image of the surrounding mobile unit. Note that the image of a front environment image (the image of a fixed object) acquired at other time may be incorporated into the area from which the image of the surrounding mobile unit is erased.

By executing the above mobile unit erasing process, even when a surrounding image is generated by using a past image, the generated surrounding image is prevented from including the image of a surrounding mobile unit that is actually not present around the host vehicle at the present time, so it is possible to provide the driver, or the like, with a highly reliable surrounding image.

FIG. 9 is a flowchart that shows an example of main processes that may be executed by the processing device 10 of the vehicle surroundings monitoring apparatus 2 shown in FIG. 5. The processing routine shown in FIG. 9 may be, for example, repeatedly executed at predetermined intervals (for example, each frame period of the front-view camera 40) while the host vehicle is travelling forward or may be repeatedly executed at predetermined intervals while an ignition switch is on (including while the host vehicle is stopped). However, in the latter case, the processing routine does not need to be executed while the host vehicle is travelling backward. In addition, the processes of steps (particularly, the processes of step 906 to step 912) shown in FIG. 9 do not always need to be executed in the sequence shown in FIG. 9. The sequence of the processes may be appropriately changed or some of the processes may be executed simultaneously (in parallel).

In step 900, the location of the eyepoint at the time of generating a surrounding image to be output in a current cycle is determined. Here, particularly, the predetermined distance L0 behind the host vehicle is determined. When the predetermined distance L0 is a fixed value, step 900 may be omitted.

In step 902, the time of a past image used to generate the surrounding image to be output in the current cycle is determined. As the time of the past image, where a current vehicle speed is v, and, as described above, on the basis of the current vehicle speed v (m/s) and the predetermined distance L0 (m), time that is L0/v (s) past from the present time may be calculated.

In step 904, a front environment image (past image) captured by the front-view camera 40 at the past time determined in step 902 is loaded from the memory 11.

In step 906, the mobile unit erasing process (see FIG. 8) is executed on the front environment image loaded in step 904. Note that, when the mobile unit erasing process has been executed at the time when the front environment image was acquired (before the front environment image is stored in the memory 11), step 906 is omitted.

In step 908, the host vehicle image 70 is synthesized with the front environment image loaded in step 904 (see FIG. 7A to FIG. 7C). Note that the synthesized position of the host vehicle image 70 is, as described above, pixel positions corresponding to the current location of the host vehicle in the front environment image loaded in step 904. The size of the host vehicle image 70 may be varied on the basis of the predetermined distance L0 as described above.

In step 910, it is determined whether there is a surrounding mobile unit on the basis of latest detection data from the radar sensor 50, and, when there is a surrounding mobile unit, the relative location, and the like, of the surrounding mobile unit is calculated (acquired) from the latest detection data.

In step 912, on the basis of the processing result of step 910, when there is a surrounding mobile unit, the surrounding mobile unit image 72 (see FIG. 7) that shows the surrounding mobile unit is synthesized with the front environment image loaded in step 904, and, by so doing, the surrounding image is generated.

In step 914, the generated surrounding image is output to (shown on) the display 20. In this way, the surrounding image is output to the display 20 in real-time.

Note that, in the embodiment described with reference to FIG. 4 and the following drawings, the past image captured by the front-view camera 40 mounted on the host vehicle is used as the past image; however, the description of the embodiment described with reference to FIG. 5 and the following drawings may be similarly applied to the case where a past image captured by another camera (for example, a past image captured by a roadside camera, a past image captured by a probe car camera, or the like) is used.

The embodiment of the invention is described in detail above; however, the invention is not limited to the above-described embodiment. The above-described embodiment may be modified or replaced in various forms without departing from the scope of the invention.

For example, in the embodiment described with reference to FIG. 4 and the following drawings, the radar sensor 50 is used as means for detecting a surrounding mobile unit; instead, the means for detecting a surrounding mobile unit may be any means or a combination of the means. For example, when a roadside facility (for example, a server) collects current positional information obtained from the GPS of each surrounding vehicle (surrounding mobile unit), the positional information of each surrounding vehicle around the host vehicle may be acquired from the roadside facility (that is, a system in which each vehicle transmits its own positional information to the roadside facility and the roadside facility transmits the positional information of each surrounding vehicle around the host vehicle to the host vehicle). In this case, the roadside facility may have information about the property of each surrounding vehicle (property that is usable to generate the above-described surrounding mobile unit image 72), and the host vehicle may acquire such information from the roadside facility. In addition, the means for detecting a surrounding mobile unit may be a rear-view camera that captures an area behind the vehicle. In addition, the means for detecting a surrounding mobile unit may be an inter-vehicle communication device that exchanges positional information with a surrounding vehicle.

In addition, in the embodiment described with reference to FIG. 4 and the following drawings, a surrounding mobile unit behind the vehicle (mobile unit behind) is mainly detected by a rearward radar sensor as the radar sensor 50 and is synthesized as the surrounding mobile unit image 72; instead, another surrounding mobile unit may also be similarly detected and may be synthesized as a similar surrounding mobile unit image. For example, a mobile unit lateral to the host vehicle or a mobile unit ahead of the host vehicle may also be detected by, for example, a lateral radar sensor, a forward radar sensor, or the like, and an image that shows the mobile unit lateral to the host vehicle or the mobile unit ahead of the host vehicle may be synthesized with a front environment image (past image) on the basis of the detected result to generate a surrounding image. In this way, as long as a surrounding mobile unit that is currently present within the angle of view of a surrounding image, the image of the surrounding mobile unit may be synthesized with a front environment image (past image) irrespective of where the surrounding mobile unit is located with respect to the host vehicle.

The invention claimed is:

1. A vehicle surroundings monitoring apparatus comprising:
    a camera that is mounted on a vehicle;
    a display device that is mounted on the vehicle;
    a processing device that is mounted on the vehicle,
    the processing device configured to:
        output a surrounding image as viewed from an eyepoint behind the vehicle to the display device while the vehicle is travelling forward or the vehicle is stopped, the surrounding image including a current location of the vehicle,
        output the surrounding image based on a past image captured by the camera at a location that is a predetermined distance behind the current location of the vehicle, and the predetermined distance corresponding to a distance from the vehicle to the eyepoint behind the vehicle, wherein
        the past image captured by the camera at the location that is the predetermined distance behind the current location of the vehicle is a first image captured by the camera at the time when the vehicle passed through a point that is the predetermined distance behind the current location of the vehicle, and
        generate the surrounding image by synthesizing the first image with a third image that shows a surrounding mobile unit; and a detecting device configured to detect a relative positional relationship between the vehicle and the surrounding mobile unit and that outputs the relative positional relationship to the processing device, wherein the processing device is further configured to determine a position at which the third image is synthesized on the basis of the current relative positional relationship between the surrounding mobile unit and the vehicle, output from the detecting device.

2. The vehicle surroundings monitoring apparatus according to claim 1, wherein
the camera captures an area ahead with reference to a forward travelling direction of the vehicle.

3. The vehicle surroundings monitoring apparatus according to claim 1, wherein
the processing device generates the surrounding image by synthesizing the first image with a second image that shows the vehicle.

4. The vehicle surroundings monitoring apparatus according to claim 3, wherein
the processing device determines a position at which the second image is synthesized based on the current location of the vehicle.

5. The vehicle surroundings monitoring apparatus according to claim 1, wherein
the processing device generates the surrounding image by erasing an image of a mobile unit in the first image.

6. The vehicle surroundings monitoring apparatus according to claim 1, wherein
the processing device changes the predetermined distance.

7. A vehicle surroundings monitoring method, the vehicle having a camera mounted on the vehicle, a processing device, a detecting device and a display device mounted on the vehicle, the method comprising:

acquiring, by the camera, a first image captured at a location that is a predetermined distance behind a current location of a vehicle;

generating, by the processing device, a surrounding image as viewed from an eyepoint behind the vehicle, including the current location of the vehicle, by using the first image which is a past image captured by the camera at a time when the vehicle was located the predetermined distance behind the current location of the vehicle, the predetermined distance corresponding to a distance from the vehicle to the eyepoint behind the vehicle; and showing, by the display device, the surrounding image while the vehicle is travelling forward or the vehicle is stopped, wherein
the past image captured by the camera at the location that is the predetermined distance behind the current location of the vehicle is a first image captured by the camera at the time when the vehicle passed through a point that is the predetermined distance behind the current location of the vehicle, and generating the surrounding image by synthesizing the first image with a third image that shows a surrounding mobile unit; and detecting, by the detecting device, a relative positional relationship between the vehicle and the surrounding mobile unit and outputting the relative positional relationship to the processing device, determining, by the processing device, a position at which the third image is synthesized on the basis of the current relative positional relationship between the surrounding mobile unit and the vehicle, output from the detecting device.

* * * * *